Figure 1:
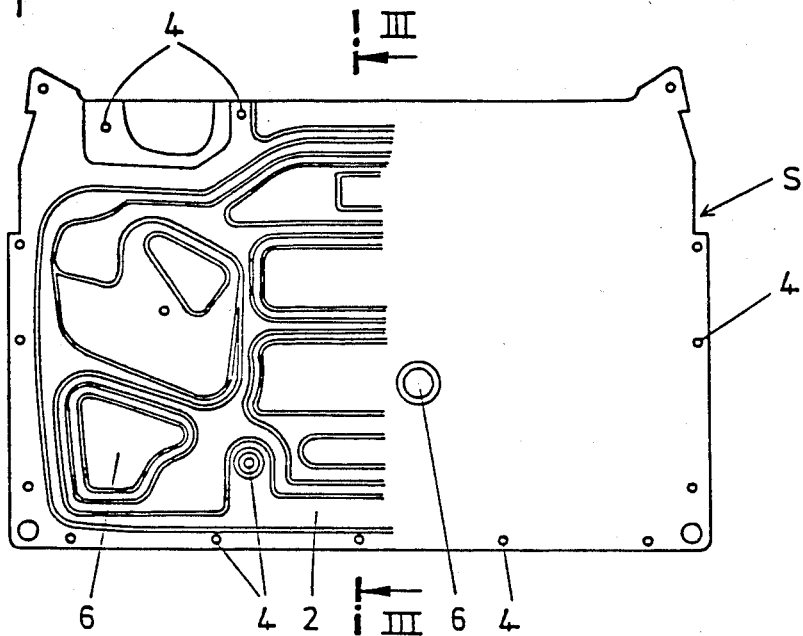

United States Patent [19]

Frank et al.

[11] Patent Number: 4,584,232
[45] Date of Patent: Apr. 22, 1986

[54] FOAM MATERIAL SOUND ABSORPTION

[75] Inventors: Werner Frank, Bergisch Gladbach; Josef F. Irregeher, Leverkusen, both of Fed. Rep. of Germany

[73] Assignee: Illbruck GmbH Schaumstofftechnik, Fed. Rep. of Germany

[21] Appl. No.: 654,020

[22] PCT Filed: Jan. 20, 1984

[86] PCT No.: PCT/DE84/00014
§ 371 Date: Sep. 13, 1984
§ 102(e) Date: Sep. 13, 1984

[87] PCT Pub. No.: WO84/02998
PCT Pub. Date: Aug. 2, 1984

[30] Foreign Application Priority Data

Jan. 20, 1983 [DE] Fed. Rep. of Germany ....... 3301682
Oct. 11, 1983 [DE] Fed. Rep. of Germany ....... 3336850

[51] Int. Cl.$^4$ ............ G10K 11/6; E04B 1/82; B60R 13/08; B32B 5/18
[52] U.S. Cl. .................. 428/247; 181/288; 181/294; 428/159; 428/170; 428/174; 428/304.4; 428/309.9; 428/316.6; 428/317.1; 428/318.6
[58] Field of Search .............. 180/90; 181/286, 288, 181/291, 294, DIG. 1; 264/321; 296/70; 428/137, 139, 140, 156, 158–160, 304.4, 309.9, 316.6, 318.6, 170, 174, 247, 255, 256, 317.1, 317.3, 317.5, 317.7, 317.9

[56] References Cited

U.S. PATENT DOCUMENTS 3,072,582  1/1963  Frost .................... 521/131
4,347,276  8/1982  Weber et al. ............ 428/309.9

FOREIGN PATENT DOCUMENTS 780177  3/1968  Canada .................. 428/316.6
1154923  9/1963  Fed. Rep. of Germany .
2937389  4/1981  Fed. Rep. of Germany .
2368111  5/1978  France .
1510712  5/1978  United Kingdom .

Primary Examiner—William J. Van Balen
Attorney, Agent, or Firm—Wood, Herron & Evans

[57] ABSTRACT

The present invention relates to a sound absorbing member comprising a fiber grid insert disposed between and bonded to two open cell foam panels.

6 Claims, 5 Drawing Figures

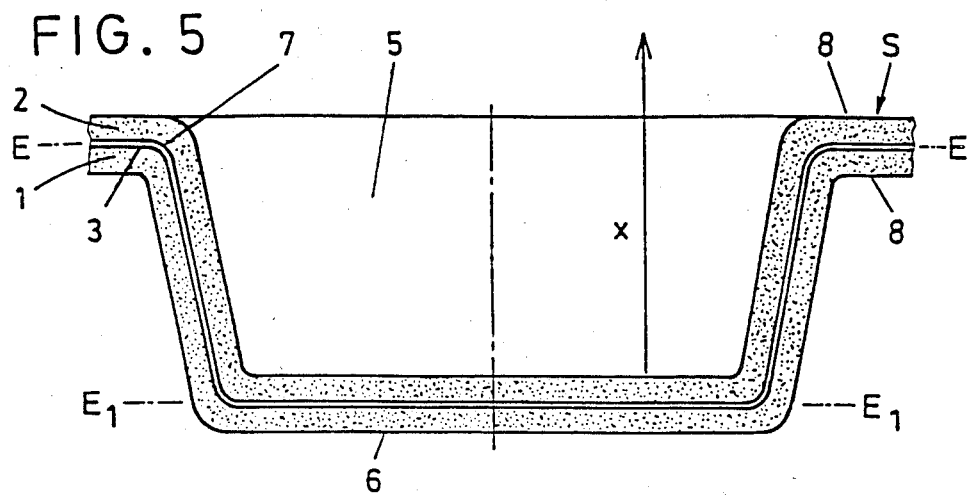
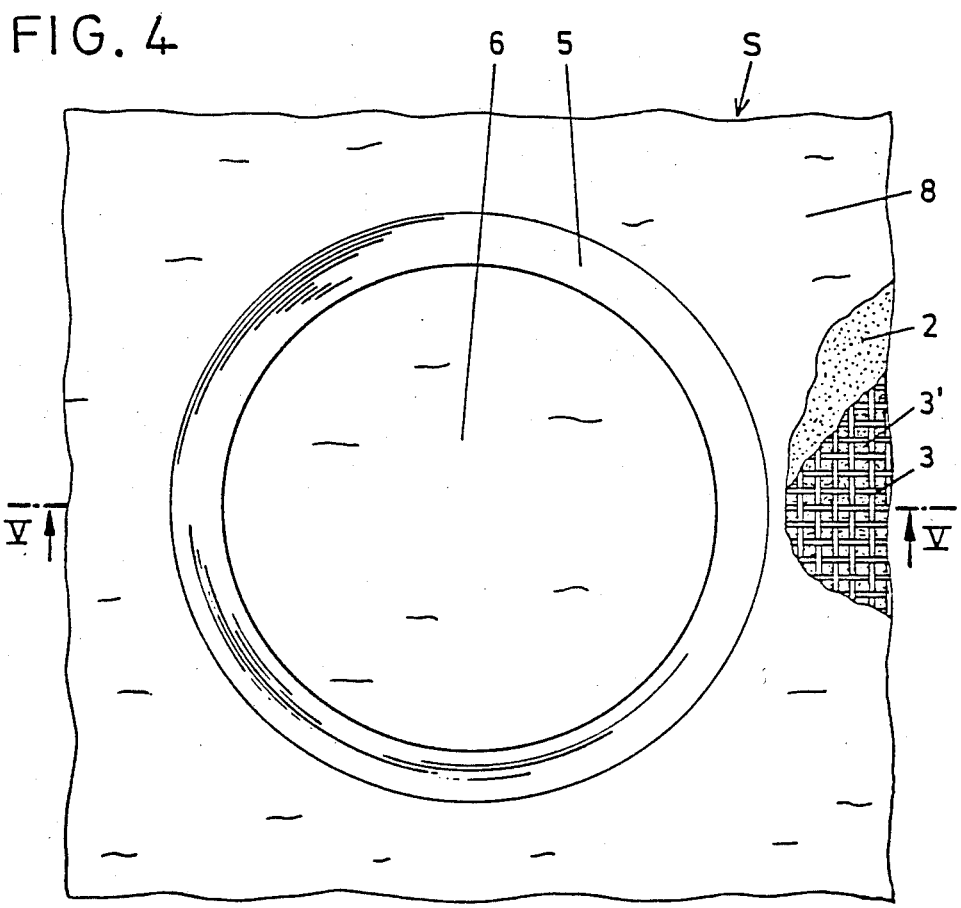

FOAM MATERIAL SOUND ABSORPTION

The construction and automobile industries are known to use insulation board from foam material for noise abatement. The sound-absorbing effect results from the thickness of the panel, its mass, increased preferably through embedded heavyweight layers. This way of sound absorption using foam material is thereby very expensive in terms of material, requires much volume, involves increased weight, and remains nevertheless relatively ineffective.

The problem underlying the invention is to show a way toward optimizing the ratio between material expense and sound absorption utilizing plastic foam materials. The invention does not choose the avenue of sound insulation, but that of sound absorption utilizing the not self-suggestive insight that such is possible with plastic foam materials.

This is accomplished through the teaching set forth in the main claim. The subclaims represent favorable advancements of the panel so used.

Using certain foam material panels for the first time according to the principle of the flow-optimized absorber, instead of sound insulation, the solution achieves a greater and even optimal sound absorption in the area of audible frequencies at minimum material expense and thus also minimum weight loading of the object being insulated. The sound absorption panel may have a uniform thickness between 1 and 10 mm. But areas of varying thickness, within this range, may occur also on one and the same foam material sound absorption panel. The same applies with regard to the homogeneity regarding a flow resistance value on one and the same panel and/or various panel areas. The corresponding bending strength value is optimal for the self-supporting property and the absorption behavior. It can be accomplished favorably in terms of manufacture, through an embedded grid which codetermines the flow resistance of the entire panel: This applies especially when using foam materials with a low inherent hardness, for manufacturing reasons. As the case may be, such a grid insert, may also be integrated in the hot-compacting of a heavier foam material panel, where the hot-compacting makes for the adjustment of the flow resistance value from 20 to 120 rayls. The adjustment of the flow resistance value can also be accomplished by skin formation on one broadside of the panel. Such skinning may be effected by customary calendering of one foam material broadside under pore reduction to the extent giving the respective flow resistance. But the resistance may also be obtained by applying on one panel broadside a cover foil which through its own porosity produces the respective flow resistance (together with the foam material and/or a grid insert). In the spacing arrangement of a so fabricated foam material sound insulation panel relative to the reflecting wall, the broadside with the skin will then be on the far side of the foam material sound insulation panel, from the sound-reflecting wall. An appropriate bearing edge of the entire panel guarantees a fool-proof, correct spacing relative to the sound-reflecting wall.

The object of the invention will be more fully explained hereafter with the aid of a pictorally illustrated embodiment.

Figure 2:
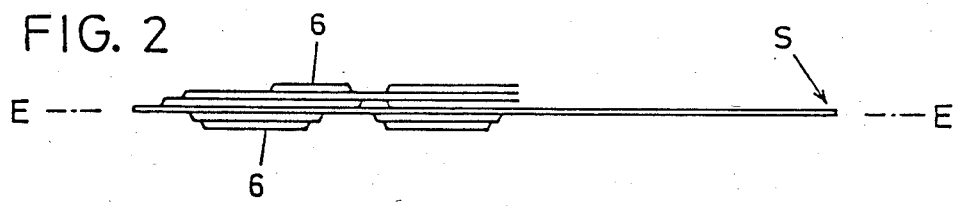
Figure 3:
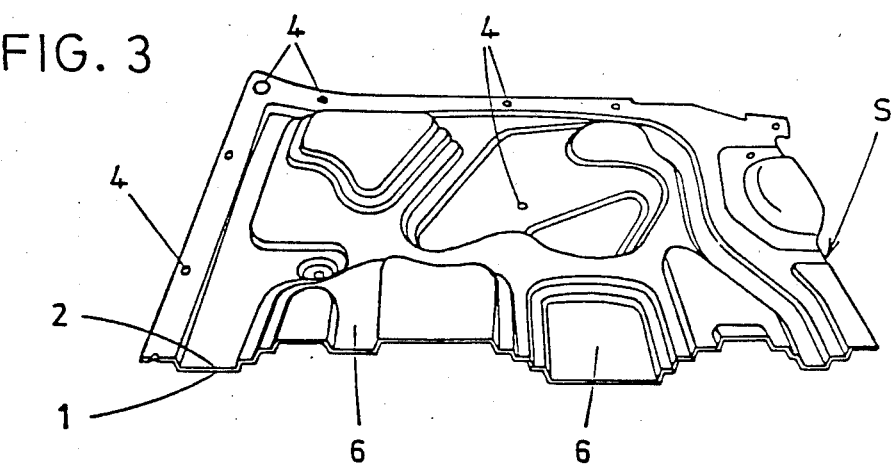

FIG. 1 shows a bottom view of the inventional sound absorption panel as a shaped component adapted to an automotive engine hood;

FIG. 2, a side elevation of it;

FIG. 3, a section along lines III—III in FIG. 1;

FIG. 4, an enlargement of a cup type section, and at that, at approximately actual scale;

FIG. 5, a section along line V—V in FIG. 4.

The sound absorption panel S designed as a shaped component is composed of three layers. These are a bottom layer from compacted plastic foam-material, that is, the layer 1 facing the source of noise, and a corresponding layer 2 on the wall or hood side, i.e., facing the sound reflecting surface. Embedded between these two layers is a sound-transparent nonelastically bendable grid 3 as a third layer. This layer may be wire mesh or a grid from other materials. In the embodiment it is a fiberglass fabric with a thermally responding resin coating. The bending strength of the entire panel ranges at approximately 20 Newton/mm$^2$. Self-supporting, the shaped component is thus mounted before a wall with an intervening space, for instance on an engine compartment hood, utilizing the 4 through-holes for fasteners.

The sound absorption panel (5) consists of open-cell, soft elastic plastic foam material. The flow resistance of the foam material panel S including grid, which overall is about 3 to 5 mm thick, ranges suitably between 20 and 120 rayls. Allowing for the applicable frequency range (in the engine compartment of a motor vehicle), the flow resistance is optimally 80 rayls. But the indicated limit ranges up to 20 rayls, for one, and 120 rayls, for another, still yield considerable sound absorption effects as compared to what otherwise would have to be expended with customary insulating foam materials, in thickness, in order to obtain the same sound insulation value.

Raising parts of the panel from the general plane E-E causes a variation of the space from the sound-reflecting wall. According to FIG. 5, this section is designed as a cup-shaped recess 5. Variably selected in contingence on frequency, one of these spaces is marked x. It equals about lambda/4 (and/or an integer multiple thereof) of the frequency range to be absorbed forwardly. The rises of the reflected wave impinge on the forward plane $E_1$—$E_1$ which is closer to the sound emitter. As follows from FIG. 1 and the relief drawing relative to FIG. 3, the forward panel sections 6 may be step wise advanced or retracted in the interest of a nonvibrating structure, especially with very low sections 6. The plastic foam material tolerates the respective lengthwise stretching superbly. In the case of especially jagged panel structures, thermally deformable material is used for the grid 3.

The mounted holes 4 are so located that the most favorable connecting points between these areas will be covered.

As follows from FIG. 5, the layers 1 and 2 are drawn around the rounded edges 7 and/or forced into the inside corners essentially under retention of a uniform layer thickness and structure, due to the only slight thickness of, at any rate, less than 10 mm. The very slight thickness variations do not subtract from the absorption effect because the mass, and especially the flow resistance to air passage as such does not change.

The layers 1 and 2 may be bonded already previously, instead of during the shaping process, for instance by hot-sealing and/or adhesive bonding. Thermally responding adhesive favors the irreversible shaping. The thermal bonding joins the foam material layers through the meshes 3'.

Concomitant with this compression shaping to the specified air flow resistance, a protective skin 8 can be formed through melting of the outer areas of the foam structure, which skin prevents moisture, oil etc. from penetrating into the final product. The skin 8 may as well be produced already before on the porous layer material. Such a skin, especially when wholly or for the msot determining the flow resistance value by its adapted porosity, is located on the far panel broadside from the sound-reflecting wall.

All of the new characteristics mentioned in the description and illustrated in the drawing are inventionally essential, also if not expressly made a part of the claims.

We claim:

1. A sound absorbing member comprising
a first open cell foam panel,
a second open cell foam panel,
a fiber grid insert disposed between said panels,
a bonding substance which bonds said grid fibers together and bonds said first and second panels to said grid insert,
said panels being compacted under heat and pressure to provide an acoustical impedance of from 20 to 120 rayls.

2. The said absorbing member of claim 1 in which said acoustical impedance is 80 rayls.

3. The said absorbing member of claim 1 in which said sound absorbing member is of a non-planar configuration and said panels and said grid are formed into said non-planar configuration during compaction under heat and pressure.

4. The sound absorbing member of claim 3 in which said compaction under heat and pressure takes place only by zones.

5. The said sound absorbing member of claim 1 in which a skin is formed on the outer surface of one of said panels to provide the acoustical impedance of from 20 to 120 rayls.

6. The sound absorbing member of claim 1 in which a portion of the outer surface of the first panel is spaced from the plane of the marginal surface of said panel by a multiple of the panel thickness, and said marginal portion of said panel forms a bearing edge.

* * * * *